United States Patent [19]

Fukushima

[11] Patent Number: 5,269,198
[45] Date of Patent: Dec. 14, 1993

[54] LIQUID VISCOUS DAMPER

[75] Inventor: Hirotaka Fukushima, Neyagawa, Japan

[73] Assignee: Kabushiki Kaisha Daikin Seisakusho, Osaka, Japan

[21] Appl. No.: 861,897

[22] PCT Filed: Nov. 14, 1991

[86] PCT No.: PCT/JP91/01555

§ 371 Date: Jun. 25, 1992

§ 102(e) Date: Jun. 25, 1992

[87] PCT Pub. No.: WO92/09825

PCT Pub. Date: Jun. 11, 1992

[30] Foreign Application Priority Data

Nov. 27, 1990 [JP] Japan .................. 2-327795

[51] Int. Cl.$^5$ .............................. F16F 15/10
[52] U.S. Cl. .................. 74/573 F; 74/527; 192/106.2
[58] Field of Search ............. 74/573 F, 573 R, 574, 74/527; 192/70.17, 106.2; 464/64, 65, 66, 68

[56] References Cited

U.S. PATENT DOCUMENTS

| | | | |
|---|---|---|---|
| 2,465,832 | 3/1949 | Banker | 74/527 |
| 3,311,718 | 3/1967 | Allison et al. | 74/527 |
| 4,783,895 | 11/1988 | Reik | 74/573 F X |
| 4,890,709 | 1/1990 | Reik et al. | 192/106.2 X |
| 4,960,147 | 10/1990 | Diamond | 74/527 X |
| 5,048,658 | 9/1991 | Reik | 192/106.2 |
| 5,097,722 | 3/1992 | Fukushima | 192/106.2 X |
| 5,180,044 | 1/1993 | Fukushima | 464/66 X |

FOREIGN PATENT DOCUMENTS

| | | |
|---|---|---|
| 63-19440 | 1/1988 | Japan . |
| 2-10846 | 3/1990 | Japan . |
| 2-59337 | 4/1990 | Japan . |
| 2-203041 | 8/1990 | Japan . |
| 91/10078 | 7/1991 | PCT Int'l Appl. ........ 74/573 F |

Primary Examiner—Leslie A. Braun
Assistant Examiner—Ryan W. Massey
Attorney, Agent, or Firm—Armstrong, Westerman, Hattori, McLeland & Naughton

[57] ABSTRACT

A liquid viscous damper having drive plates (3) and driven plates (23) in a case (1). The drive plates (3) have an annular housing (35) mounted thereon and slidable relative to drive plates (3) in a circumferential direction. A maximum torsional torque limiting stopper mechanism is installed between the housing (35) and the driven plates (23). A torque limiter (51), including balls (52), ball engaging concave portions (53) and urging springs (55) are positioned between the casing (1) and the drive plates (3). The ball engaging concave portions (53) are formed on a sliding surface of the casing (1) and the balls are urged by the urging springs (55) to be pressed onto the sliding surfaces of the case (1) so as to engage with the ball engaging concave portion (53) by a specified pressure for disengagement from concave portions (53) when excessive impact torque is applied.

1 Claim, 4 Drawing Sheets

LIQUID VISCOUS DAMPER

TECHNICAL FIELD

This invention relates to a damper used for a vibration damper connecting an engine flywheel and a transmission input shaft or for a damper disc of automobile clutch, and particularly to a liquid viscous damper producing a hysteresis torque by means of viscosity of liquid.

BACKGROUND ART

This kind of damper has an input-side drive plate 61 in which a freely rotatable output-side driven plate 62 and liquid for producing a hysteresis torque are incorporated, and includes a damper mechanism for producing a torsional torque installed in between the driven plate 62 and the drive plate 61, as shown by FIG. 5 for example.

A projection edge 62a of the output-side driven plate 62 and a projection edge 66a of the input-side annular plate 66 compose a final stopper mechanism, and the input side is coupled integrally to the output side when the both edges contact each other at the maximum torsion angle.

In order to let free an impact torque etc., the annular plate 66 is designed to freely slidable relative to the drive plate 61 in a circumferential direction and is divided into two pieces by a plane perpendicular to its axis, and both side faces of the annular plate 66 are pressed onto the drive plate 61 with a specified pressure by means of urging springs 68, as illustrated by FIG. 4. By thus constructing the damper, a torque can be transmitted from the drive plate 61 to the annular plate 66, and a slip can be produced between the annular plate 66 and the drive plate 61 so as to release an excessive impact torque when this excessive impact torque is given.

Since liquid is filled in the drive plate 61, a coefficient of friction between friction surfaces 61b and 66b is small. Accordingly, when a torque limiter is designed to produce a torque by pressing flat friction surfaces each other, a very large pressing force is required for setting a specified limit torque value at which the slippage occurs. For this reason, a large number of springs 68 having a large spring force become necessary, and it is also required to widen the friction surfaces 61b and 66b, as shown by FIG. 5.

DISCLOSURE OF THE INVENTION

Structure of the Invention

In order to solve the above-mentioned problem, this invention provides a liquid viscous damper having an input-side drive plate in which a freely rotatable output-side driven plate and liquid for producing a hysteresis torque are incorporated, and including a damper mechanism for producing a torsional torque installed in between the driven plate and the drive plate, characterized by that the drive plate is equipped with an annular housing slidable relative to it in circumferential direction, a max. torsional torque limiting stopper mechanism is installed between the housing and the driven plate, a torque limiter including balls, ball engaging concave portions and urging springs is installed between the housing and the drive plate, the ball engaging concave portions are formed on sliding surfaces of the drive plate, and the balls are put in guide holes made on the housing and urged by the urging springs to be pressed onto the sliding surfaces of the drive plate so as to engage with the ball engaging concave portions by a specified pressure.

Function

When a torsional torque value is smaller than or equal to a setting torque value of the torque limiter, the balls of the torque limiter are engaged with the ball engaging concave portions so that the torque is transmitted from the driven plate through the torque limiter to the annular housing.

In the event when an excessive impact torque etc. is produced, the driven plate is coupled integrally to the annular housing through the stopper mechanism, the balls get out of the ball engaging concave portions to release the torque limiter, and the drive plate is twisted relative to the annular housing. Thus, the impact torque etc. is absorbed.

BEST MODE FOR CARRYING OUT THE INVENTION

Figure 1:
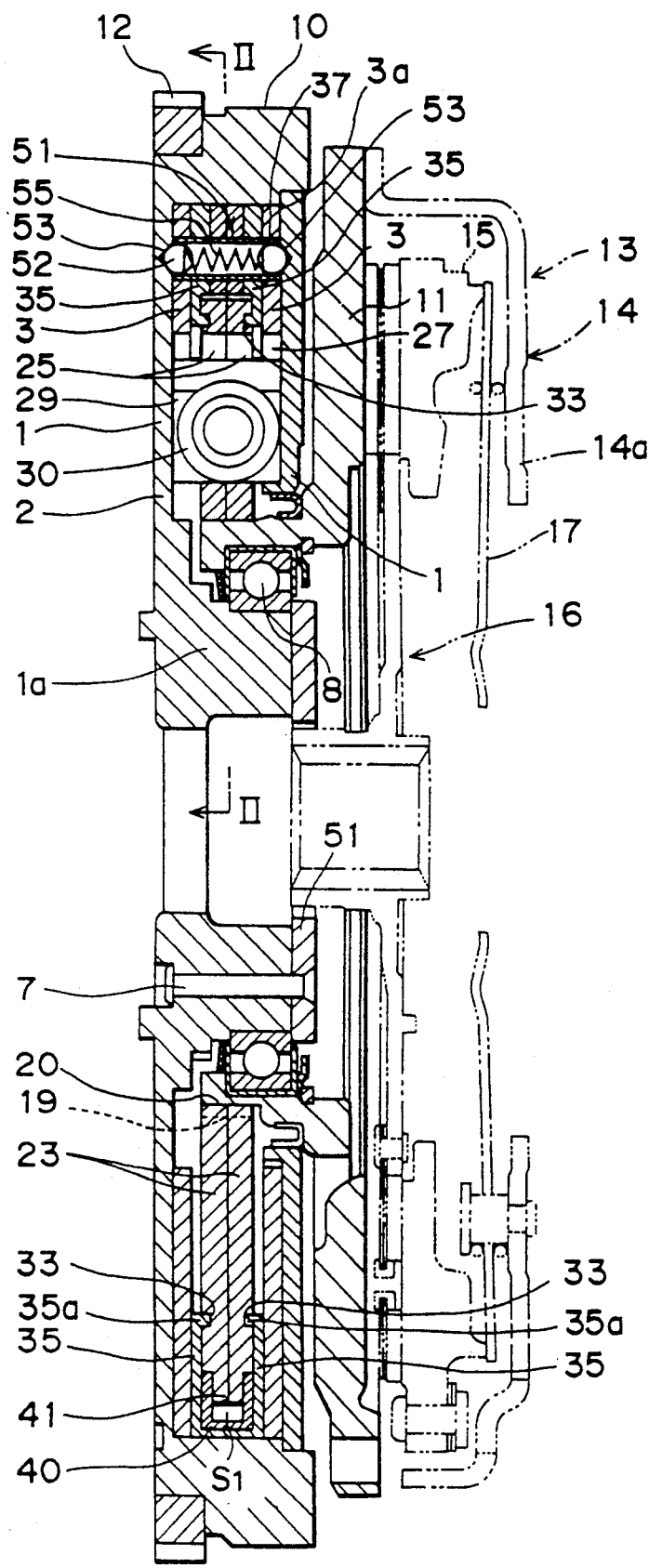
FIG. 1 is a vertical sectional view (corresponding to a sectional view taken on a line I—I of FIG. 2) of the liquid viscous damper to which this invention is applied.

FIG. 1 is the vertical sectional view of an example of the liquid viscous damper to which this invention is applied. In FIG. 1, a pair of front and rear input-side cases 1 are integrally connected through rivets 7 at its inner peripheral hub 1a and coupled to a crank shaft of engine, and a first flywheel 10 having a ring gear 12 is provided at their outer peripheries. An output-side second flywheel 11 freely rotatably fits onto an outer periphery of the input-side hub 1 through a bearing 8, and a clutch 13 is connected to an end face of the second flywheel 11. The clutch 13 includes a clutch disc 16 and a clutch cover 14 having a cover portion 14a secured to the second flywheel 11, a pressure plate 15 and a diaphragm spring 17 etc. The clutch disc 16 is coupled to a transmission input shaft, for example.

An output-side driven plate 23 comprising a pair of sheets is housed in between the drive plates 3, and the driven plate 23 engages with waved inner teeth 19 of the second flywheel 11 at its waved outer teeth 20 so as to rotate integrally with the second flywheel 11. Plural holes 25 are made on the driven plate 23 with spaces between them in rotation direction, and holes 26 and concave portions 27 are formed on locations corresponding to the holes 25. Torsional torque producing coil springs 30 are disposed in the holes 25 and 26 and the concave portions 27 respectively in such a manner as freely compressible in the rotation direction. On the other hand, the holes 26 of the drive plate 3 are covered by the cover plate 2.

An annular liquid chamber housing 35 is arranged at a radial outside of the driven plate 23. The annular liquid chamber housing 35 is held between the drive plates 3 in such a manner as slidable in a circumferential direction, and is engaged with the drive plate 3 at a specified pressure by a torque limiter 51 which is an essential part of this invention. A section of the liquid chamber housing 35 is formed into an U-shape opening to an axis side, and a pair of annular projections 35a are formed at radial inside ends of the liquid chamber housing 35. The annular projections 35a fit in annular grooves 33 formed at both radial outsides of the driven plate 23, and seal the liquid chamber.

Figure 3:
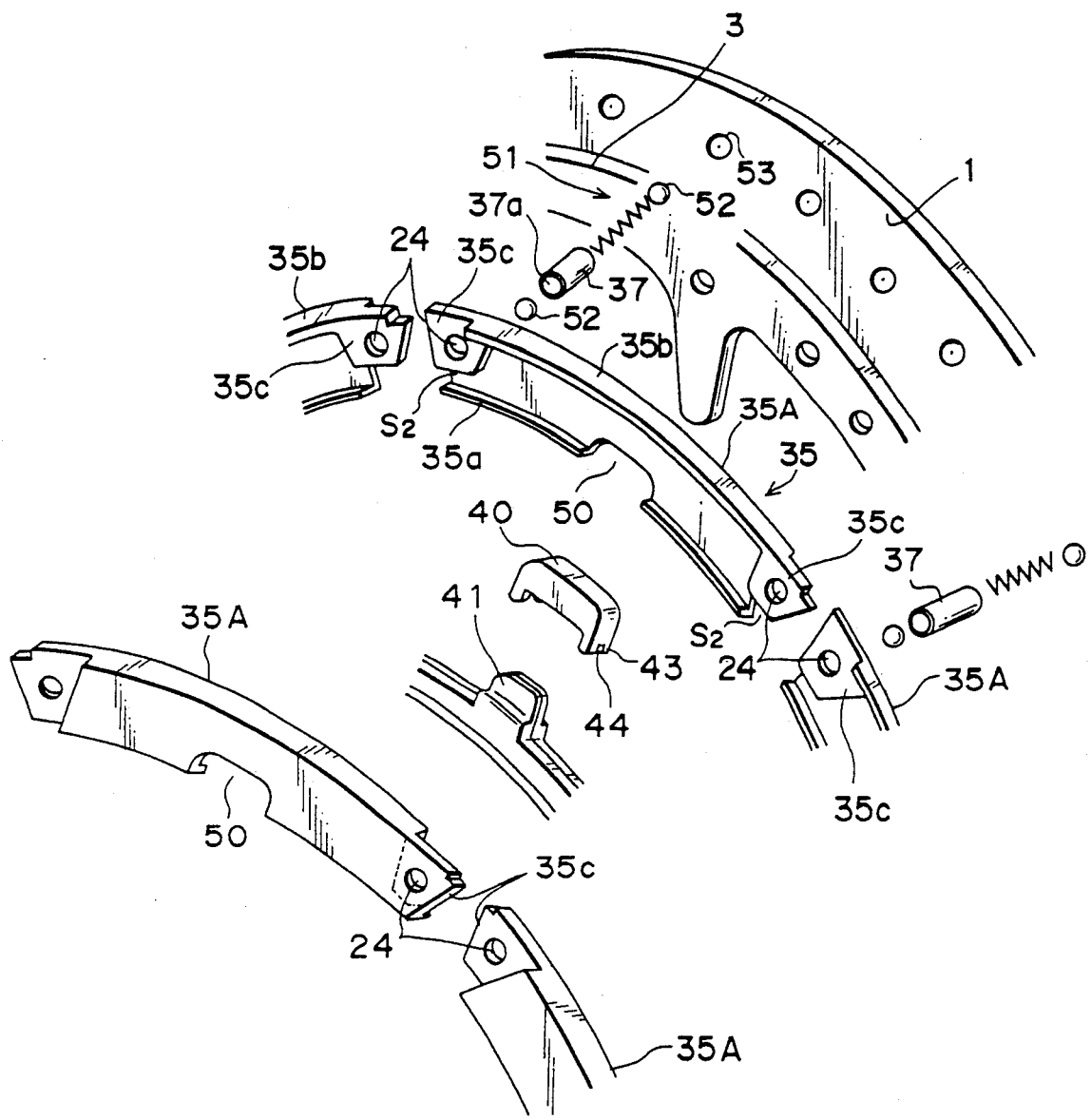
FIG. 3 is an exploded partial oblique view of a liquid chamber housing.
Figure 4:
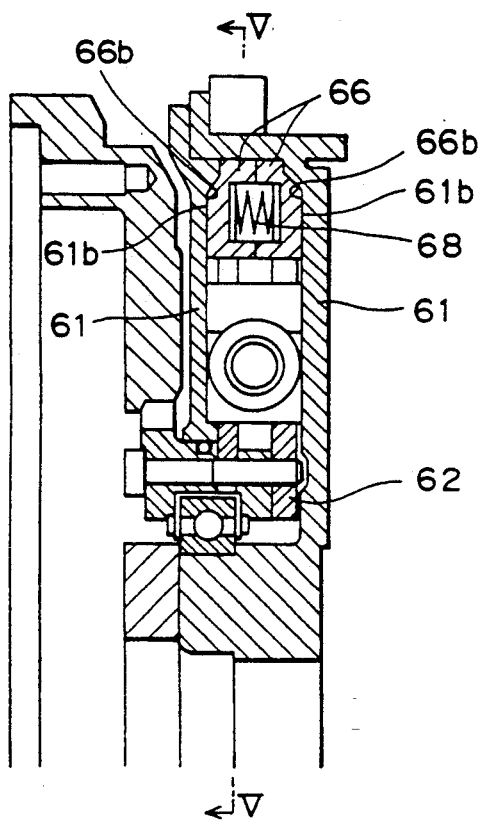
FIG. 4 vertical sectional view of a conventional damper.
Figure 5:
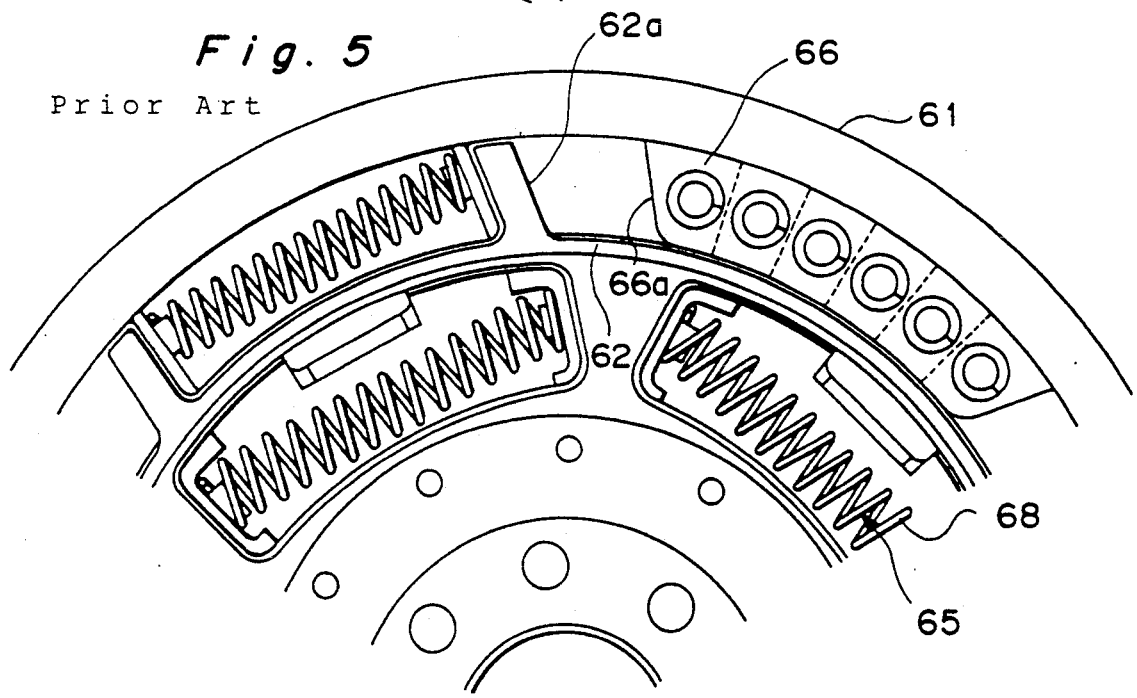
FIG. 5 is a partial sectional view taken on a line V—V of FIG. 4.

The liquid chamber housing 35 is divided into right and left parts (both sides in an axial direction) as shown by FIG. 3, and also divided into five pieces in the circumferential direction, thus being composed of totally ten arcuate housing members 35A. Bosses 35c having collar fitting holes 24 are formed on both circumferential ends of each housing members 35A. The bosses 35c of the housing members 35A are placed one upon another and connected by a cylindrical hollow collar 37, so that the housing is assembled into the annular shape.

A main orifice slider 40 is disposed in the liquid chamber housing 35 so as to be slidable in the circumferential direction. The slider 40 is formed into a box shape which opens at its inner side, and its outer peripheral wall disposed at a radial outside is formed into an arcuate shape fitting to an inside surface of an outer peripheral wall 35b of the housing 35. A pair of legs 43 are formed on insides of circumferential both ends, and a spaces between the legs 43 serves as a liquid flowing opening 44.

Figure 2:
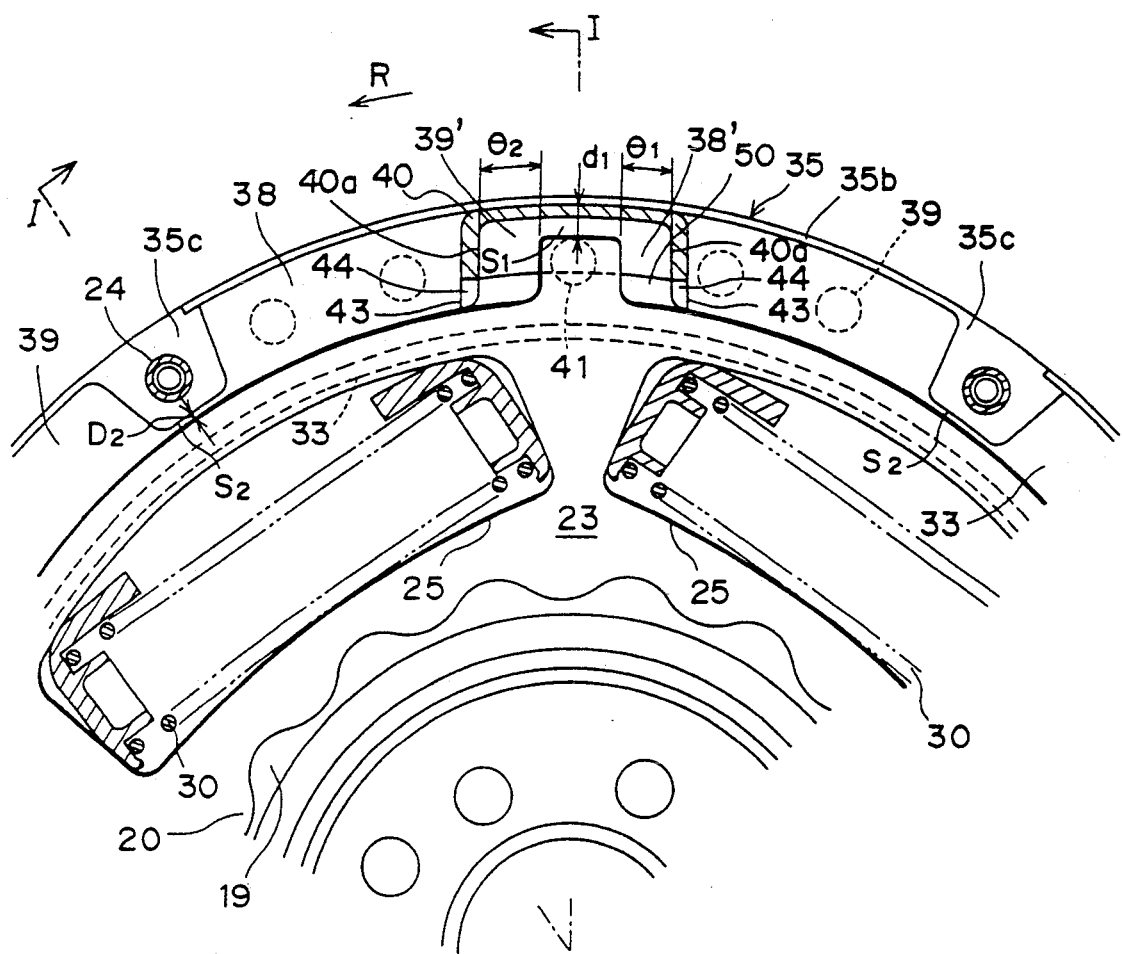
FIG. 2 is a partial sectional view taken on a line II—II of FIG. 1.

In FIG. 2, the leg 43 of the slider 44 slidably contacts with an outer peripheral edge of the driven plate 23, a projection 41 protruding to radial outside is formed on an outer peripheral end portion of the driven plate 23, and the projection 41 protrudes into the slider 40. Circumferential both side walls of the slider 40 form stoppers 40a and 40b, and are spaced from the projection 41 by angles $\theta_1$ and $\theta_2$, for example, when the engine is stopping. The projection 41 partitions a liquid chamber created between the bosses 35c into a first sub-chamber 38 located at a circumferential front side and a second sub-chamber 39 located at a circumferential rear side, and forms a main-choke S1 connecting the both sub-chambers 38 and 39 between it and the slider 40.

A sub-choke S2 connecting the both sub-chambers 38 and 39 is formed also between a radial inside edge of the boss 35c and an outside edge of the driven plate 23. A gap d1 of the main choke S1 is made larger than a gap d2 of the sub-choke S2. In other words, a flow sectional area of the sub-choke S2 is made smaller than a flow sectional area of the main-choke S1.

A stopper mechanism of the driven plate 23 relative to the housing 35 is composed by a circumferential edge 35d of the boss 35c and the foregoing projection 41, and is designed to set a maximum torsion angle.

A structure of the torque limiter 51 forming an essential part of the invention will be described hereunder. In FIG. 1, the torque limiter 51 is composed of a pair of balls 52, ball engaging concave portions 53, an urging spring 55 and the above-mentioned collar 37 etc. An inner periphery of the collar 37 serves as a ball guide hole 37a piercing in an axial direction, the urging spring 55 is installed in the ball guide hole 37a compressedly in the axial direction, and the balls 52 are arranged at axial both sides of the urging spring 55 movably in the axial direction.

The ball engaging concave portions 53 are formed on a sliding surface of the annular case 1, and an inner peripheral surface of the ball stopping concave portion 53 is formed into a conical shape, for example. The above ball engaging concave portions 53 are located on the same circumference with that of the collar 37 and are formed on plural places with spaces left between them in the circumferential direction. Each ball 52 is urged at a specified pressure by the urging spring 55 toward the drive plate sliding surface 3a side, so as to engage with the ball engaging concave portion 53. The housing 35 is thereby connected so as to rotate integrally with the driven plate 23 within a specified torque.

Function will be described hereunder. The drive plate 3 is twisted relative to the driven plate 23 forward or backward in the rotation direction when a torsion is produced. The rear boss 35c contacts with the projection 41 through a stopper 40a of a slider 40 when the torsion angle reaches its maximum value, and the driven plate 23 rotates integrally together with the drive plate 3 through the annular housing 35.

When an excessive impact torque is given, the balls 52 of FIG. 1 are pushed in the guide holes 37a against the urging springs 55, the balls 52 are disengaged from the ball engaging concave portions 53 of the case 1, and the case 1 is twisted relative to the driven plate 23 in the circumferential direction. Namely, the torque limiter 51 is released and the drive plate 3 is twisted relative to the case 1 so that the impact torque is absorbed. Then, after the impact torque has been absorbed, the balls 52 are recovered properly to their respective states where they engage with the ball engaging concave portions 55. States of creation and change of hysteresis torque due to movement of liquid when the torsion torque is produced, will be described hereunder. In a state where the projection 41 is not contacting with the stopper 40a of the slider 40 as illustrated by FIG. 2, when the drive plate 3 is twisted relative to the driven plate 23 to R-side in the rotation direction for example, the housing 35 and the slider 40 also move together with them to the R-side in rotation direction. The second sub-chamber 39 is thereby compressed to become small and at the same time the first sub-chamber 38 becomes large, so that liquid flows from the second sub-chamber 39 to the first sub-chamber 38 mainly through the opening 44 and the main-choke S1. Further, the liquid flows to the first sub-chamber 38 also through the gap between an outer peripheral side face of the slider 40 and the housing 35. Moreover, the liquid flows from the second sub-chamber 39 to the first sub-chamber 38 also through the sub-choke S2.

Accordingly, a flow sectional area through which the liquid flows from a semi-second chamber 39' to a semi-first chamber 38' is large, and a resistance force will thereby become small so that a small hysteresis torque H1 will be created.

When the torsional torque becomes large to cause the the rear stopper 40a to contact with the projection 41, the main-choke S1 is brought into closed-state and the slider 40 is engaged with the projection 41, so that the drive plate 3 and the housing 35 are moved forward in the rotation direction R relative to the driven plate 23 and the slider 40. In this instance, liquid in the second sub-chamber 39 flows through the sub-choke S2 to the rear first sub-chamber 38, and it also flows to the front first sub-chamber 38 through the gap between the outer peripheral side face of the slider 40 and the housing 35. Accordingly, the flow sectional area becomes small to produce a large resistance force so that a large hysteresis torque H2 will be created.

When the drive plate 3 is returned to the rear side after it is twisted to the forward side, the rear stopper 40a of the slider 40 leaves the projection 41 immediately after the plate begins returning and the main-choke S1 is opened. The fluid flows from the first sub-chamber 38 to the second sub-chamber 39 mainly through the main-choke S1 and the sub-choke S2 respectively within a twisting angle range of $\theta1+\theta2$, so that the small hysteresis torque H1 is created.

Even when a small fluctuation is produced due to combustion fluctuation, for example, under a state where the drive plate 3 is twisted by a specified angle relative to the driven plate 23, the slider 40 will vibrate within the twisting angle range of $\theta1+\theta2$ and the main-choke S1 is opened, so that the small hysteresis torque can be maintained.

Effect of the Invention (1) As described above, in the liquid viscous damper of the present invention, the stopper mechanism for limiting the maximum torsion angle is installed between the drive plate 3 and the case 1, the torque limiter 51 comprising the balls 52, the ball engaging concave portions 53 and the urging springs 55 is installed between the annular housing 35 and the drive plate 3, the urging springs 55 press the balls 52 to the drive plate side to make them engage with the ball engaging concave portions 53 so that the torque can be transmitted between the drive plate 3 and the case 1, and the balls 52 are designed to slip out of the concave portions 53 at the specified torsional torque. Therefore, a large pressing force is not required and a great number of springs having large spring force are not necessary in order to set the specified limit torque value, as compared with a conventional torque limiter in which flat friction surfaces are pressed against each other. Further, a large friction surface is not required so that a damper size can be minimized, as compared with the conventional damper.

(2) The structure of the torque limiter is composed of the ball engaging concave portions 53 and the balls 52 which engage each other, so that the specified torque can be set easily and the fluctuation of set torque value due to friction etc. is small, as compared with the conventional structure wherein the friction surfaces are pressed each other.

Industrial Applicability

This damper is applicable to various damper discs for automobile use.

What is claimed is:

1. A liquid viscous damper having input-side drive plates in which freely rotatable output-side driven plates and liquid for producing a hysteresis torque are incorporated in a case, and including a damper mechanism for producing a torsional torque and transmitting said torsional torque from said drive plates to said driven plates; characterized by that said driven plates are equipped with an annular housing slidable relative to said drive plates in a circumferential direction, a maximum torsional torque limiting stopper mechanism is positioned between said housing and said driven plates, and a torque limiter including balls, ball engaging concave portions and urging springs are positioned intermediate opposite walls of said case and passes through guide holes in said drive plates, said ball engaging concave portions being formed on opposing sliding surfaces of said case, said balls in said torque limiter in said guide holes in said drive plates being urged by said urging springs into pressing engagement with said sliding surfaces on said opposing sliding surfaces of said case for engaging said balls with said concave portions of said case by a specified pressure for disengagement from said concave portions of said case when excessive impact torque is applied.

* * * * *